US009544893B2

(12) United States Patent
Kim et al.

(10) Patent No.: US 9,544,893 B2
(45) Date of Patent: *Jan. 10, 2017

(54) METHOD OF ALLOCATING A RESOURCE IN A WIRELESS COMMUNICATION SYSTEM AND DEVICE FOR SAME

(71) Applicant: LG ELECTRONICS INC., Seoul (KR)

(72) Inventors: Kitae Kim, Anyang-si (KR); Jinyoung Chun, Anyang-si (KR); Sunam Kim, Anyang-si (KR); Jiwon Kang, Anyang-si (KR); Binchul Ihm, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,120

(22) Filed: Oct. 19, 2015

(65) Prior Publication Data

US 2016/0044643 A1 Feb. 11, 2016

Related U.S. Application Data

(63) Continuation of application No. 14/232,222, filed as application No. PCT/KR2012/004390 on Jun. 4, 2012, now Pat. No. 9,198,176.

(Continued)

(51) Int. Cl.
*H04W 4/00* (2009.01)
*H04W 72/04* (2009.01)
(Continued)

(52) U.S. Cl.
CPC .......... *H04W 72/042* (2013.01); *H04L 5/0007* (2013.01); *H04L 5/0037* (2013.01);
(Continued)

(58) Field of Classification Search
CPC ............ H04W 72/042; H04W 5/0037; H04W 5/0048; H04W 5/0053
(Continued)

(56) References Cited

U.S. PATENT DOCUMENTS 8,019,017 B2 * 9/2011 Ahn et al. ..................... 375/300
2014/0016589 A1 * 1/2014 Kang et al. ................... 370/329

FOREIGN PATENT DOCUMENTS

JP 2012-508483 4/2012
JP 2012-514361 6/2012
(Continued)

OTHER PUBLICATIONS

PCT International Application No. PCT/KR2012/004390, Written Opinion of the International Searching Authority dated Dec. 26, 2012, 16 pages.

*Primary Examiner* — Sai-Ming Chan
(74) *Attorney, Agent, or Firm* — Lee, Hong, Degerman, Kang & Waimey

(57) ABSTRACT

In a wireless communication system, when a terminal receives control information from a downlink subframe, which is divided into a Physical Downlink Control Channel (PDCCH) region and a Physical Downlink Shared Channel (PDSCH) region, in a wireless communication system, the receiving of the control information includes: receiving, from a base station, first CFI information indicating the number of Orthogonal Frequency Division Multiplexing (OFDM) symbols available for Physical Downlink Control Channel (PDCCH) transmission; receiving, from the base station, second CFI information indicating start OFDM symbol information available for Physical Downlink Shared Channel (PDSCH) transmission corresponding to an enhanced Physical Downlink Control Channel (E-PDCCH); and receiving the PDSCH from the base station on the basis of the first CFI information or the second CFI information.

(Continued)

The PDCCH is placed in the PDCCH region of the downlink subframe, and the E-PDCCH is placed in the PDSCH region of the downlink subframe.

16 Claims, 9 Drawing Sheets

Related U.S. Application Data

(60) Provisional application No. 61/507,607, filed on Jul. 14, 2011.

(51) Int. Cl.
*H04L 5/00* (2006.01)
*H04W 72/12* (2009.01)

(52) U.S. Cl.
CPC .......... *H04L 5/0048* (2013.01); *H04L 5/0053* (2013.01); *H04W 72/12* (2013.01)

(58) Field of Classification Search
USPC ........................................................ 370/333
See application file for complete search history.

(56) References Cited

FOREIGN PATENT DOCUMENTS

| KR | 10-2011-0020732 | 3/2011 |
|----|-----------------|--------|
| KR | 10-2011-0072063 | 6/2011 |
| WO | 2010/053984 | 5/2010 |
| WO | 2010/076300 | 7/2010 |
| WO | 2011/025202 | 3/2011 |
| WO | 2011/037439 | 3/2011 |

\* cited by examiner

METHOD OF ALLOCATING A RESOURCE IN A WIRELESS COMMUNICATION SYSTEM AND DEVICE FOR SAME

CROSS-REFERENCE TO RELATED APPLICATIONS

This application is a continuation of U.S. patent application Ser. No. 14/232,222, filed on Mar. 10, 2014, now U.S. Pat. No. 9,198,176, which is the National Stage filing under 35 U.S.C. 371 of International Application No. PCT/KR2012/004390, filed on Jun. 4, 2012, which claims the benefit of U.S. Provisional Application No. 61/507,607, filed on Jul. 14, 2011, the contents of which are hereby incorporated by reference herein in their entirety.

TECHNICAL FIELD

The present invention relates to a wireless communication system, and more particularly, to a method and apparatus for allocating frequency resources to new control channels located in a data region of a node in a distributed multi-node system.

BACKGROUND ART

In a current wireless communication environment, the emergence and proliferation of various devices such as Machine-to-Machine (M2M) devices conducting M2M communication, smart phones requiring large-data transmission, and tablet computers is a driving force behind a very rapid increase in the amount of data required for a network of a wireless communication system. To meet the requirement of a larger amount of data, carrier aggregation and cognitive radio have been developed to efficiently use more frequency bands, and multi-antenna technology and multi-base station cooperation technology have been developed to increase a data capacity in a limited frequency. The wireless communication environment is evolving toward more densely populated nodes accessible to users. Such a system having densely populated nodes may provide higher system performance through cooperation between nodes. In this scheme, each node conducts cooperative communication through a plurality of nodes operating as Base Stations (BSs), Advanced BSs (ABSs), Node Bs, evolved Node Bs (eNBs or eNode Bs), Access Points (APs), antennas, antenna groups, Remote Radio Heads (RRHs), or Remote Radio Units (RRUs).

Further, if one controller manages transmission and reception of all nodes and thus individual nodes act as antenna groups of an eNB, this system may be regarded as a Distributed Multi-Node System (DMNS). The individual nodes may be allocated separate Node Identifiers (IDs) or operate as some antennas of a cell without Node IDs.

If the nodes of a DMNS have different cell IDs, this system may be considered to be a multi-cell system (e.g. including a macro cell, a femto cell, and a pico cell). If the multiple cells formed by the respective nodes are overlaid according to their coverage, this network is referred to as a multi-tier network.

Various types of BSs may be used as nodes irrespective of their appellations. That is, a BS, a Node B, an eNB, a Picocell eNB (PeNB), a Home eNB (HeNB), an RRH, an RRU, a relay, a repeater, etc. may act as a node. At least one antenna is installed in one node. The antenna may be any of a physical antenna, an antenna port, a virtual antenna, and an antenna group. A node may also be referred to as a point.

Although a node typically refers to an antenna group spaced by a predetermined distance or more, the node may mean an arbitrary antenna group irrespective of the distance. For example, an eNB may control a node having H-pol antennas and a node having V-pol antennas. In the present disclosure, the term antenna may be replaced with the terms physical antenna, antenna port, virtual antenna, antenna group, etc.

DISCLOSURE

Technical Problem

An object of the present invention devised to solve the problem lies on a method and apparatus for efficiently allocating resources to a physical channel in a wireless communication system. Another object of the present invention lies on a channel format, a signal process, and an apparatus for efficiently transmitting control information. A further object of the present invention lies on a method and apparatus for efficiently allocating resources in which control information is to be transmitted.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The object of the present invention can be achieved by providing a method for receiving control information in a downlink subframe divided into a Physical Downlink Control Channel (PDCCH) region and a Physical Downlink Shared Channel (PDSCH) region at a User Equipment (UE) in a wireless communication system, including receiving, from a Base Station (BS), first Control Format Indicator (CFI) information indicating the number of Orthogonal Frequency Division Multiplexing (OFDM) symbols available for transmission of a PDCCH, receiving, from the BS, second CFI information indicating a starting OFDM symbol available for transmission of a PDSCH corresponding to an Enhanced PDCCH (E-PDCCH), and receiving a PDSCH based on the first CFI information or the second CFI information from the BS. The PDCCH is positioned in the PDCCH region of the downlink subframe and the E-PDCCH is positioned in the PDSCH region of the downlink subframe.

In another aspect of the present invention, provided herein is a method for transmitting control information in a downlink subframe divided into a PDCCH region and a PDSCH region at a BS in a wireless communication system, including transmitting, to a UE, first CFI information indicating the number of OFDM symbols available for transmission of a PDCCH, transmitting, to the UE, second CFI information indicating a starting OFDM symbol available for transmission of a PDSCH corresponding to an E-PDCCH, and transmitting a PDSCH based on the first CFI information or the second CFI information to the UE. The PDCCH is located in a PDCCH region of the downlink subframe and the E-PDCCH is located in a PDSCH region of the downlink subframe.

In another aspect of the present invention, provided herein is a UE for receiving control information in a downlink subframe divided into a PDCCH region and a PDSCH region in a wireless communication system, including a Radio Frequency (RF) unit, and a processor. The processor is configured to control the RF unit to receive, from a BS, first CFI information indicating the number of OFDM symbols available for transmission of a PDCCH, to control the RF unit to receive, from the BS, second CFI information indicating a starting OFDM symbol available for transmission of a PDSCH corresponding to an E-PDCCH, and to control the RF unit to receive a PDSCH based on the first CFI information or the second CFI information from the BS. The PDCCH is located in a PDCCH region of the downlink subframe and the E-PDCCH is located in a PDSCH region of the downlink subframe.

In another aspect of the present invention, provided herein is a BS for transmitting control information in a downlink subframe divided into a PDCCH region and a PDSCH region in a wireless communication system, including an RF unit and a processor. The processor is configured to control the RF unit to transmit, to a UE, first CFI information indicating the number of OFDM symbols available for transmission of a PDCCH, to control the RF unit to transmit, to the UE, second CFI information indicating a starting OFDM symbol available for transmission of a PDSCH corresponding to an E-PDCCH, and to control the RF unit to transmit a PDSCH based on the first CFI information or the second CFI information to the UE. The PDCCH is located in a PDCCH region of the downlink subframe and the E-PDCCH is located in a PDSCH region of the downlink subframe.

The first CFI information may be transmitted from the BS by Radio Resource Control (RRC) signaling and the second CFI information may be received from the BS by RRC signaling or on the E-PDCCH.

The PDSCH may be received from the BS only based on the first CFI information in a subframe carrying a control channel for an idle UE.

Advantageous Effects

According to the embodiments of the present invention, resources may be efficiently allocated to a physical channel in a wireless communication system, preferably a Distributed Multi-Node System (DMNS).

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
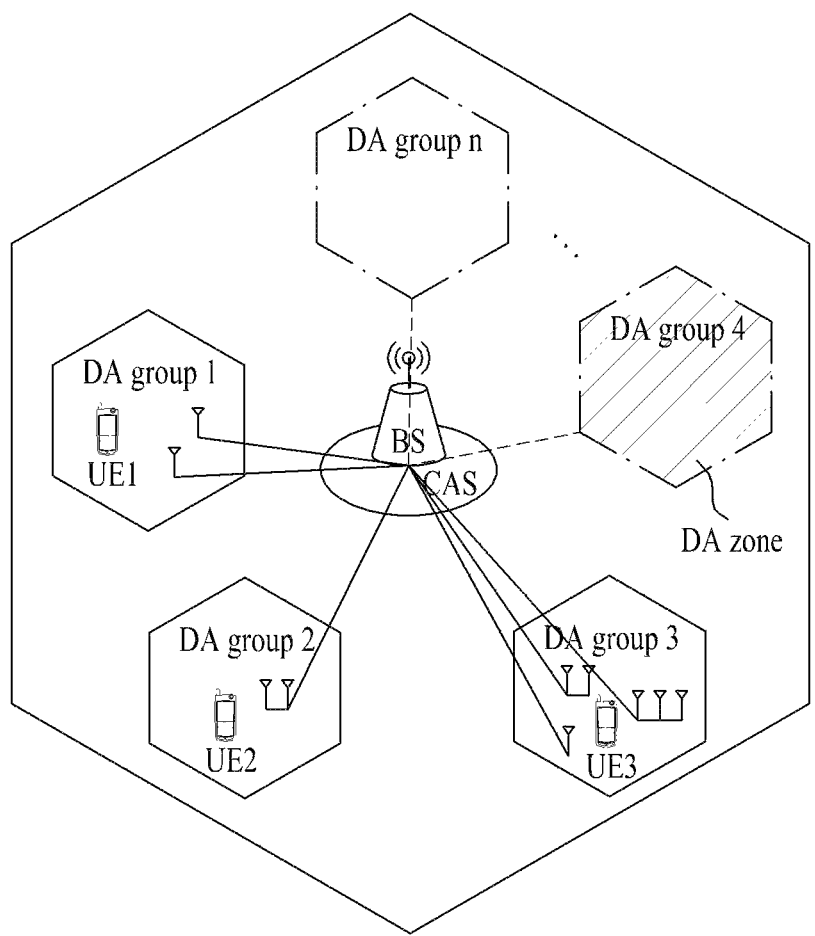
FIG. 1 illustrates an exemplary Distributed Antenna System (DAS) configuration to which the present invention is applied.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description is given in the context of a $3^{rd}$ Generation Partnership Project Long Term Evolution (3GPP LTE) system or an Institute of Electrical and Electronics Engineers (IEEE) 802.16m system as a mobile communication system. However, the present invention is applicable to other mobile communication systems except for features inherent to the 3GPP LTE system or the IEEE 802.16m system.

In some instances, known structures and devices are omitted or are shown in block diagram form, focusing on important features of the structures and devices, so as not to obscure the concept of the invention. The same reference numbers will be used throughout this specification to refer to the same parts.

A wireless communication system to which the present invention is applicable includes at least one Base Station (BS). Each BS provides a communication service to a User Equipment (UE) within a specific geographical area (generally called a cell). The UE is fixed or mobile. The UE is a device that transmits and receives user data and/or control information by communicating with a BS. The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'evolved-Node B (eNB or eNode B)', 'Base Transceiver System (BTS)', 'Access Point (AP)', 'Processing Server (PS)', etc.

A cell area to which a BS provides a service may be divided into a plurality of smaller areas to improve system performance. Each smaller area may be referred to as a sector or a segment. While a Cell Identifier (ID) (Cell_ID or IDCell) is allocated from the perspective of a whole system, a sector ID or a segment ID is allocated from the perspective of a cell area to which a BS provides a service. UEs are generally distributed in a wireless communication system and are fixed or mobile. Each UE may communicate with one or more BSs at a specific time point on an UpLink (UL) and/or a DownLink (DL).

The present invention is applicable to various kinds of multi-node systems. For example, embodiments of the present invention may be applicable to a Distributed Antenna System (DAS), a macro node having low-power Remote Radio Heads (RRHs), a multi-BS cooperative system, a pico-cell/femto-cell cooperative system, or a combination thereof. In a multi-node system, one or more BSs connected to a plurality of nodes may simultaneously transmit signals to or receive signals from a UE through cooperation.

A DAS conducts communication using a plurality of distributed antennas connected to a BS or a BS Controller (BSC) by a cable or a dedicated line, which manages a plurality of antennas apart from each other by a predetermined interval within a geographical area (or a cell). In the DAS, each antenna or each antenna group may be a node in the multi-node system of the present invention and each antenna may operate as a subset of antennas in the BS or the BSC. That is, the DAS is a kind of multi-node system and distributed antennas or a distributed antenna group is a kind of node in a multi-antenna system. The DAS is different from a Centralized Antenna System (CAS) in that a plurality of antennas are apart from each other by a predetermined distance in the former and a plurality of antennas are concentrated at the center of a cell in the latter. In addition, the DAS is different from a femto-cell/pico-cell cooperative system in that all antennas located within a cell are managed by a BS or a BSC at the center of the cell, not by distributed antennas or a distributed antenna group in the DAS. In addition, the DAS is different from a relay system or an ad-hoc network in that distributed antennas are interconnected by a cable or a dedicated line in the former, whereas a BS is connected wirelessly to a Relay Station (RS) in the latter. The DAS is different from a repeater in that a distributed antenna or a distributed antenna group transmits, to a UE located near to the antenna or the antenna group, a different signal from a signal from another distributed antenna or another distributed antenna group by a command received from a BS or a BSC in the former, whereas a signal is simply amplified and forwarded in the latter.

In a multi-BS cooperative system or a femto-cell/pico-cell cooperative system, each node operates as an independent BS and cooperates with other nodes. Therefore, each BS of the multi-BS cooperative system or the femto-cell/pico-cell cooperative system may be a node of the multi-node system according to the present invention. Multiple nodes are interconnected through a backbone network or the like and perform a cooperative transmission/reception by performing scheduling and/or handover jointly in the multi-BS cooperative system or the femto-cell/pico-cell cooperative system. Such a system in which a plurality of BSs participate in cooperative transmission is referred to as a Coordinated Multi-Point (CoMP) system.

Various types of multi-node systems such as a DAS, a macro node having low-power RRHs, a multi-BS cooperative system, and a femto-cell/pico-cell cooperative system are different from one another. However, these multi-node systems are different from single-node systems (e.g., a Centralized Antenna System (CAS), a conventional Multiple Input Multiple Output (MIMO) system, a conventional relay system, a conventional repeater system, etc.). Since a plurality of nodes participate in providing a communication service to a UE by cooperation, embodiments of the present invention are applicable to any of these multi-node systems. For the convenience of description, the present invention will be described mainly in the context of a DAS. However, this is purely exemplary and thus it is to be understood that since an antenna or an antenna group of the DAS may correspond to a node of another multi-node system and a BS of the DAS may correspond to one or more cooperative BSs of another multi-node system, the present invention is applicable to other multi-node systems in the same manner.

FIG. 1 illustrates an exemplary DAS structure to which the present invention is applied. Specifically, an exemplary system structure is shown, in which a DAS is applied to a conventional CAS using cell-based multiple antennas.

Referring to FIG. 1, a plurality of Centralized Antennas (CAs) having similar effects such as similar path losses due to a narrow antenna spacing relative to a cell radius may be located in an area near to a BS according to an embodiment of the present invention. A plurality of Distributed Antennas (DAs) each having a different effect such as a different path loss due to a wider antenna spacing than the CAs may be distributed apart from the cell area by a predetermined distance or farther.

A DA includes one or more antennas connected to the BS by one cable. The term DA is interchangeable with the terms DA antenna node or antenna node in the same meaning. One or more DAs form one DA group, thus forming a DA zone.

A DA group includes one or more DAs. The DA group may be configured dynamically according to the location or reception state of a UE or may be configured to include a fixed maximum number of antennas used for MIMO. A DA group may also be called an antenna group. A DA zone is defined as a range in which the antennas of a DA group may transmit or receive signals. A cell area illustrated in FIG. 1 includes n DA zones. A UE belonging to a DA zone may communicate with one or more DAs of the DA zone and the BS may increase a transmission rate by transmitting a signal to the UE of the DA zone using both a DA and a CA.

FIG. 1 illustrates a conventional CAS structure using multiple antennas to which a DAS is added so that a BS and a UE may use the DAS. While CAs and DAs are shown as located separately for the simplicity of description, the present invention is not limited to the specific locations of the CAs and the DAs, and the CAs and the DAs may be positioned in various manners depending on implementation.

A cell area to which a BS provides a service may be divided into a plurality of smaller areas to improve system performance. Each smaller area may be referred to as a sector or a segment. While a cell ID (Cell_ID or IDCell) is assigned from the perspective of a whole system, a sector ID or a segment ID is assigned from the perspective of a cell area to which a BS provides a service. UEs may be distributed across a wireless communication system and may be fixed or mobile. Each UE may communicate with one or more BSs on a UL and a DL.

FIG. 1 illustrates a CAS including a DAS in the conventional multi-antenna CAS structure, so that a BS and a UE may use the DAS. While CAs and DAs are shown as located separately for the simplicity of description, the present invention is not limited to the specific locations of the CAs and the DAs illustrated in FIG. 1, and the CAs and the DAs may be positioned in various manners depending on implementation.

AS illustrated in FIG. 1, limited antennas or antenna nodes may support each UE. Particularly for DL data transmission, different data may be transmitted to different UEs in the same time and frequency resources through different antennas or antenna nodes. This may be regarded as a kind of MU-MIMO operation in which a different data stream is transmitted through each antenna or antenna node by selecting the antenna or antenna node.

In the present invention, each antenna or antenna node may be an antenna port. An antenna port is a logical antenna configured with one or more physical transmission antenna elements. In addition, each antenna or antenna node may be a virtual antenna in the present invention. In beamforming, a signal transmitted by a precoded beam may be considered to be transmitted through one antenna and the antenna that transmits the precoded beam is called a virtual antenna. Each antenna or antenna node may be identified by a reference signal (or a pilot signal) in the present invention. An antenna group including one or more antennas that transmit the same reference signal or the same pilot signal refers to one or more antenna sets that transmit the same reference signal or the same pilot signal. That is, each antenna or antenna node of the present invention may be interpreted as a physical antenna or a set of physical antennas, an antenna port, a virtual antenna, or an antenna identified by a reference signal/pilot signal. In embodiments of the present invention described below, an antenna or an antenna node may refer to any of a physical antenna, a set of physical antennas, an antenna port, a virtual antenna, or an antenna identified by a reference signal/pilot signal. Hereinbelow, a physical antenna, a set of physical antennas, an antenna port, a virtual antenna, and an antenna identified by a reference signal/pilot signal will be referred to as an antenna or an antenna node.

Figure 2:
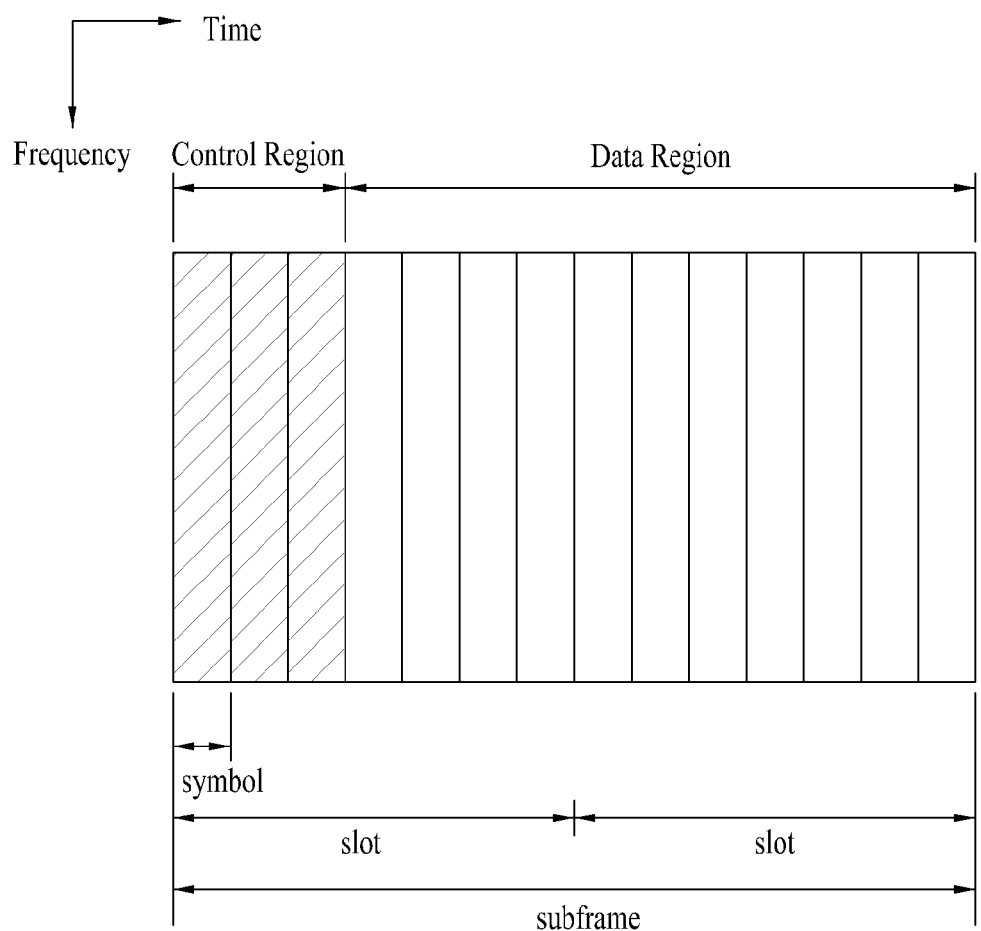
FIG. 2 illustrates an exemplary control region in which a Physical Downlink Control Channel (PDCCH) may be transmitted in a $3^{rd}$ Generation Partnership Project (3GPP) Long Term Evolution (LTE)/LTE-Advanced (LTE-A) system.

Referring to FIG. 2, a radio frame is 10 ms (32700 Ts) long, including 10 equal-sized subframes in the 3GPP LTE/LTE-A system. Each subframe is 1 ms long and divided into two slots, each having a length of 5 ms. Herein Ts represents a sampling time determined by Ts=1/(2048×15 kHz). A slot includes a plurality of OFDMA symbols in the time domain and a plurality of Resource Blocks (RBs) in the frequency domain. An RB includes a plurality of subcarriers in the frequency domain. Depending on multiple access schemes, an OFDMA symbol is referred to as an OFDMA symbol, an SC-FDMA symbol, etc. The number of OFDMA symbols in one slot may vary according to a channel bandwidth and a Cyclic Prefix (CP) length. For example, one slot includes 7 OFDMA symbols in a normal CP case, whereas one slot includes 6 OFDMA symbols in an extended CP case. While a subframe is shown in FIG. 2 as including 7 OFDMA symbols in each slot for the convenience of description, embodiments of the present invention as described below may be applied to other types of subframes in the same manner. In the 3GPP LTE/LTE-A system, a resource unit defined by one OFDMA symbol and one subcarrier is called a Resource Element (RE).

In the 3GPP LTE/LTE-A system, each subframe is divided into a control region and a data region. The control region includes one or more OFDMA symbols starting from the first OFDMA symbol. The size of the control region may be set independently in each subframe. A Physical Downlink Control Channel (PDCCH), a Physical Control Format Indicator Channel (PCFICH), and a Physical Hybrid automatic repeat request Indicator Channel (PHICH) may be allocated to the control region.

As illustrated in FIG. 2, control information is transmitted to a UE in predetermined time and frequency resources from among radio resources. A control channel delivers control information about a UE (or UEs), inclusive of MAP information. Each UE searches for a control channel among control channels transmitted by an eNB and receives the detected control channel. As more UEs are located within a cell, the proportion of resources occupied by control channels is increased. If Machine to Machine (M2M) communication and a DAS get popular, the number of UEs within a cell may further be increased. Accordingly, control channels may be bulky to support such UEs. That is, the number of OFDMA symbols occupied by control channels in a subframe and/or the number of subcarriers occupied by control channels in the subframe may be increased. Therefore, the present invention provides methods for efficiently using control channels by utilizing the characteristics of a DAS.

According to the current CAS-based communication standards, all antennas of a BS transmit control channels for all UEs (e.g. a MAP, an Advance-MAP (A-MAP), a PDCCH, etc.) in the control region. Each UE should acquire control information directed to the UE by processing the control region being a common area preset for control information transmission in order to acquire control information such as information about an antenna node allocated to the UE and DL/UL resource allocation information. For example, the UE should acquire its control information from among signals transmitted in the control region by applying a scheme such as blind decoding.

If the antennas transmit control information for all UEs in the same control region according to the current communication standards, the antennas are easily implemented since all antennas transmit the same signal in the control region. However, if the size of control information to be transmitted increases due to factors including the increase of UEs to be covered by a BS, a Multi User MIMO (MU-MIMO) operation, additional control information for a DAS (e.g. information about antenna nodes allocated to a UE), etc., the sizes or number of control channels is increased, thereby making it difficult to transmit all control information in the conventional control region.

Figure 3:
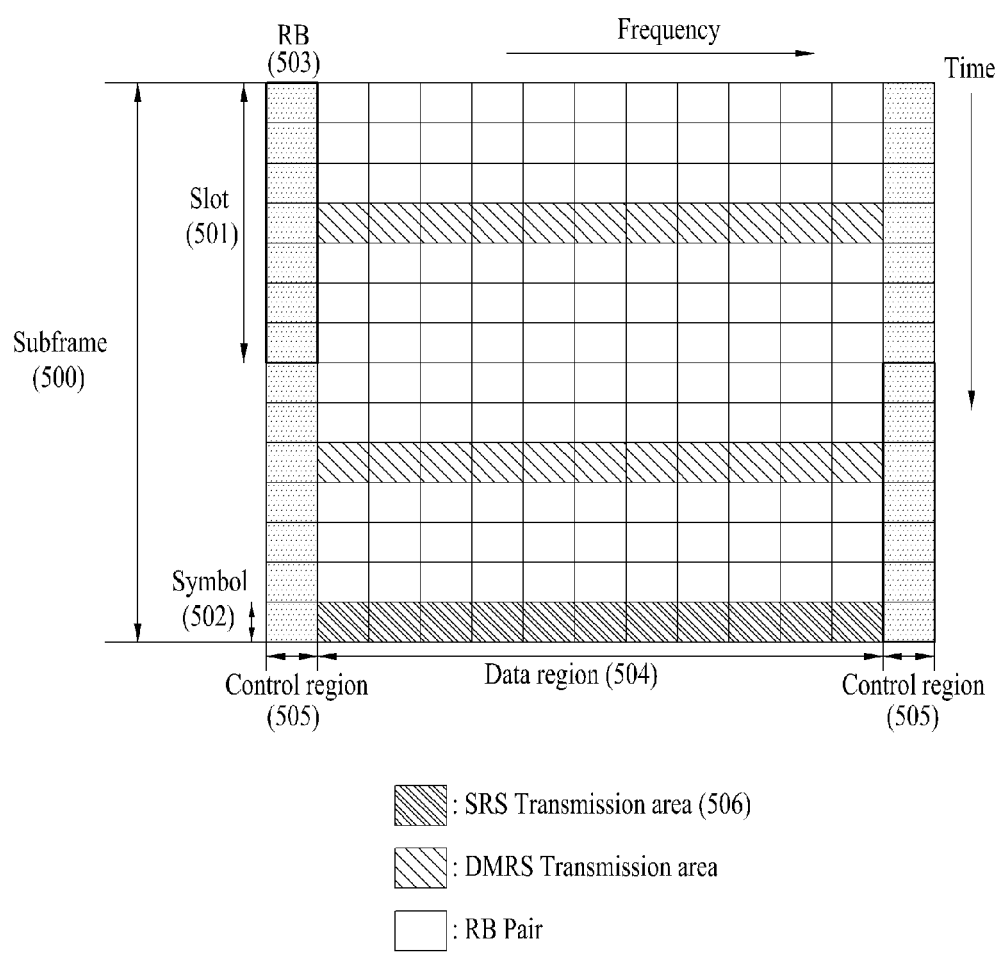
FIG. 3 illustrates a structure of an uplink subframe in a 3GPP system.

FIG. 3 illustrates a UL subframe structure used in a 3GPP system.

Referring to FIG. 3, a basic unit for LTE UL transmission, that is, a 1-ms subframe 500 includes two 0.5-ms slots 501. In a normal CP case, each slot includes 7 symbols 502 each corresponding to one SC-FDMA symbol. An RB 503 is a resource allocation unit including 12 subcarriers in frequency by one slot in time. The LTE UL subframe is largely divided into a data region 504 and a control region 505. The data region 504 is communication resources used to transmit data such as voice and packets to each UE. A Physical Uplink Shared Channel (PDSCH) is allocated to the data region 504. The control region 505 is communication resources for a UE used to transmit a DL channel quality report, an ACKnowledgement/Negative ACKnowledgement (ACK/NACK) for a DL signal, a UL scheduling request, etc. A Physical Uplink Control Channel (PUCCH) is allocated to the control region 505. A Sounding Reference Signal (SRS) is transmitted in the last SC-FDMA symbol of a subframe on the time axis in a data transmission band on the frequency axis. SRSs transmitted in the last SC-FDMA symbol of the same subframe from a plurality of UEs may be distinguished by frequency positions/sequences.

Now, RB mapping will be described. Physical Resource Blocks (PRBs) and Virtual Resource Blocks (VRBs) are defined. A PRB is configured as illustrated in FIG. 3. That is, a PRB is defined as a predetermined number of consecutive Orthogonal Frequency Division Multiplexing (OFDM) symbols in the time domain by a predetermined number of consecutive subcarriers in the frequency domain. PRBs are numbered, starting from 0 to a predetermined index in the frequency domain. A relationship between PRB indexes and REs in a slot is determined by Equation 1.

$$n_{PRB} = * \frac{k}{N_{SC}^{RB}} +$$

Equation 1

In Equation 1, k is the index of a subcarrier and $N^{RB}_{SC}$ is the number of subcarriers included in one RB.

A VRB and a PRB are of the same size. VRBs are classified into Localized VRB (LVRB) and Distributed VRB (DVRB). A pair of RBs are allocated across two slots of a subframe, along with a VRB index ( ) irrespective of the type of a VRB.

Figure 4:
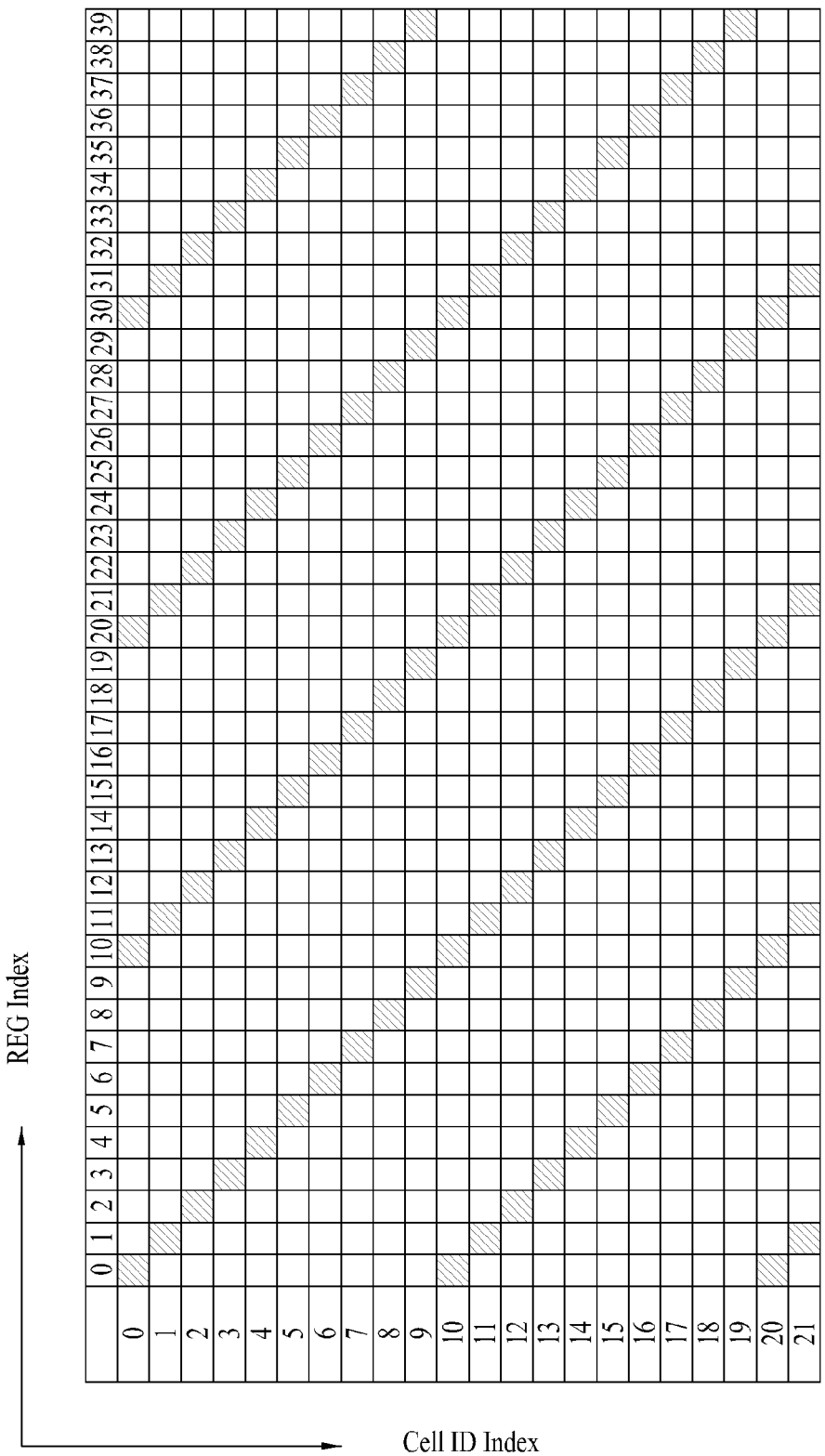
FIG. 4 illustrates control channels allocated to a downlink subframe.

FIG. 4 illustrates an exemplary mapping relationship between cell IDs and PCFICH resources.

Referring to FIG. 4, a PHICH is a physical HARQ indicator channel carrying an HARQ ACK/NACK for a UL transmission. The PHICH includes three RE Groups (REGs) and is scrambled cell-specifically. The ACK/NACK is indicated in 1 bit, spread with a Spreading Factor (SF) of 4, and repeated three times. A plurality of PHICHs may be mapped to the same resources. A PHICH is modulated in Binary Phase Shift Keying (BPSK).

A PDCCH is a physical downlink control channel allocated to the first n OFDM symbols of a subframe. Herein, n is 1 or a larger integer indicated by a PCFICH. The PDCCH is allocated in units of a CCE and one CCE includes 9 REGs. The PDCCH delivers resource allocation information about transport channels, Paging Channel (PCH) and Downlink Shared Channel (DL-SCH), a UL scheduling grant, HARQ information, etc. The PCH and the DL-SCH are transmitted on a PDSCH. Accordingly, a BS and a UE generally transmit and receive data on a PDSCH except for a specific control signal or specific service data. The PDCCH specifies how UEs are supposed to receive PDSCH data and decode the PDSCH data. For example, if the Cyclic Redundancy Check (CRC) of a specific PDCCH is masked with Radio Network temporary Identify (RNTI) "A" and the PDCCH delivers information about data which is to be transmitted in radio resources (e.g. frequency position) "B" based on transmission format information (e.g. a transport block size, a modulation scheme, coding information, etc.) "C" in a specific subframe, one or more UEs within a cell monitor PDCCHs using their RNTI information. If there are one or more UEs having RNTI "A", the UEs receive the PDCCH and receive a PDSCH indicated by "B" and "C" based on the information of the received PDCCH.

Figure 5:
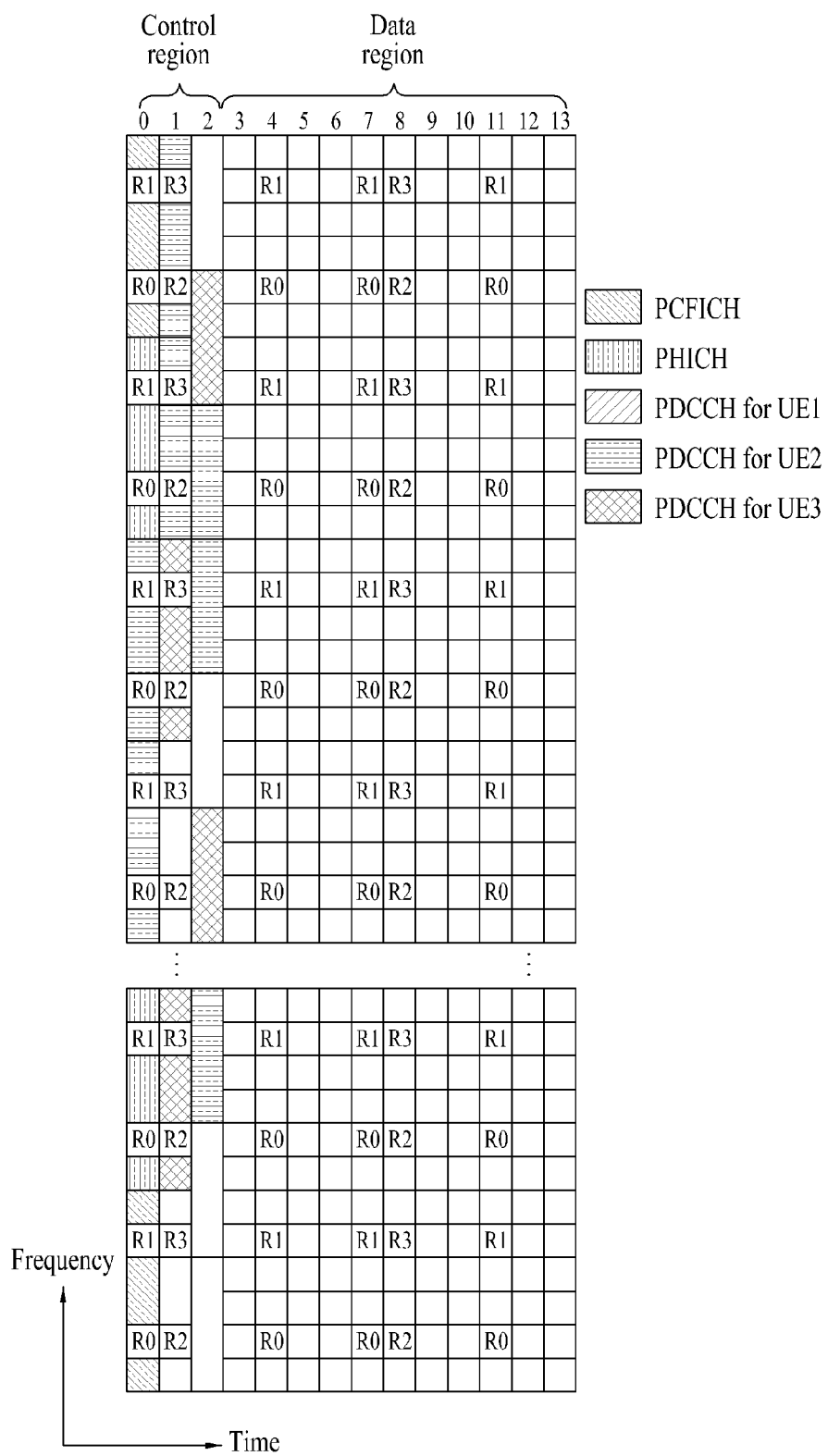
FIG. 5 illustrates an exemplary mapping relationship between Physical Control Format Indicator Channels (PCFICHs) and resources according to cell Identifiers (IDs)

FIG. 5 illustrates control channels allocated to a DL subframe. In a 3GPP Rel-11 or higher-version release system, introduction of a multi-node system having a plurality of access nodes in a cell was determined to improve performance (herein, the multi-node system includes a DAS, an RRH, a multi-node system, etc. and hereinbelow, the term RRH is used representatively). A variety of MIMO schemes and cooperative communication schemes that have been already developed or that are applicable in the future are under standardization for application to a multi-node environment. Basically, it is expected that link quality will be improved since various communication schemes such as cooperation schemes on a UE/BS basis are enabled due to the introduction of RRHs. However, there exists a pressing need for introducing a new control channel to apply the afore-described various MIMO schemes and cooperative communication schemes to the multi-node environment. To meet the requirement of a new control channel, an RRH-PDCCH, an x-PDCCH, or an E-PDCCH (hereinafter, collectively referred to as an E-PDCCH) has been discussed and it is considered that transmission of the E-PDCCH in a data region (a PDSCH region) is better than in a control region (a PDCCH region). Eventually, the E-PDCCH delivers control information about a node to each UE, thus overcoming the shortage of a legacy PDCCH region.

A legacy PDCCH is transmitted in a predetermined region by transmit diversity, without applying various schemes used for a PDSCH, such as beamforming, MU-MIMO, best band selection, etc. to the PDCCH. Therefore, the PDCCH behaves as a bottleneck of system performance, thus requiring improvement. To improve system performance, the introduction of RRHs is under discussion. In this context, there is a need for a new PDCCH to overcome lack of a PDCCH capacity in case RRHs have the same cell ID. The new PDCCH is called an E-PDCCH distinguishably from the legacy PDCCH. The present invention will be described on the assumption that an E-PDCCH is located in a PDSCH region. That is, an E-PDCCH and a PDSCH corresponding to the E-PDCCH are characterized by a structure for transmitting control information in the data region of an existing subframe, relative to a conventional structure for transmitting control information in the control region of the subframe.

Referring to FIG. 5, a subframe includes 14 OFDM symbols. The first 3 OFDM symbols of the subframe are allocated as a control region and the remaining 11 OFDM symbols are allocated as a data region. In FIG. 5, R1, R2, R3, and R4 represent Common Reference Signals (CRSs) for antenna 0, antenna 1, antenna 2, and antenna 3, respectively. The CRSs are fixed to a predetermined pattern in a subframe irrespective of the control region and the data region. A control channel is allocated to resources except for CRS resources in the control region and a traffic channel is also allocated to resources except for CRS resources in the data region. Control channels allocated to the control region are a PCFICH, a PHICH, a PDCCH, etc.

The PCFICH is a physical control format indicator channel indicating the number of OFDM symbols used for PDCCHs in each subframe to UEs. The PCFICH resides in the first OFDM symbol of a subframe. The PCFICH occupies 4 REGs which are distributed across the control region according to a cell ID. One REG includes 4 REs. The structure of an REG has been described before with reference to FIG. 4. The PCFICH indicates a value of 1, 2, or 3 and is modulated in 16-ary Quadrature Phase Shift Keying (16QAM).

Figure 6:
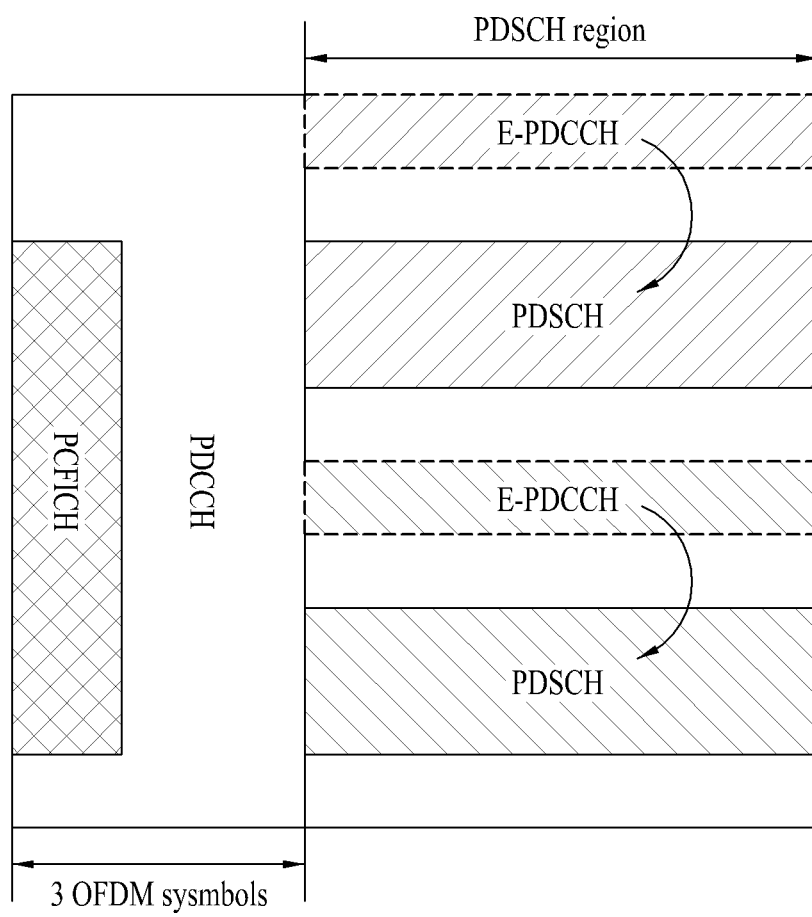
FIG. 6 illustrates an exemplary resource allocation by an Enhanced Physical Downlink Control Channel (E-PDCCH)

FIG. 6 illustrates an exemplary resource allocation by an E-PDCCH.

Referring to FIG. 6, the E-PDCCH may be allocated to a part of a PDSCH region in which data is generally transmitted. A UE should perform blind decoding to detect an E-PDCCH directed to the UE. Minimum information about an area in which to detect the E-PDCCH may be signaled by newly defining a PDCCH or a PCFICH in advance. While the E-PDCCH performs the same scheduling function (PDSCH and PUSCH control) as the legacy PDCCH, the number of blind decodings is increased with more E-PDCCHs allocated to the PDSCH region due to the increase of UEs accessing RRHs and thus UE complexity may be increased.

Figure 7:
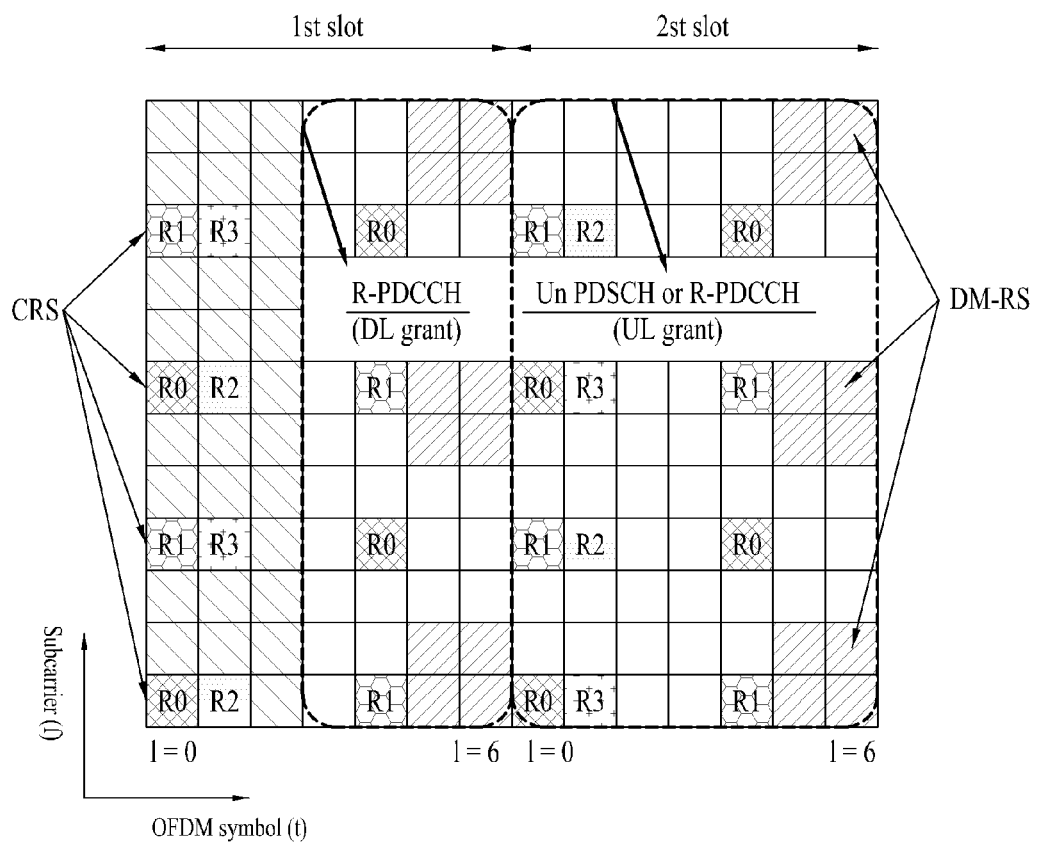
FIG. 7 illustrates an exemplary Relay PDCCH (R-PDCCH) allocation structure for a relay.

FIG. 7 illustrates an R-PDCCH allocation structure for a relay in a Frequency Division Duplexing (FDD) system. As a specific E-PDCCH allocation scheme, a conventional R-PDCCH structure may be reused. That is, an E-PDCCH is configured like an R-PDCCH. This scheme reuses an already existing structure, thus having a relatively small impact on the existing standard. In regards to the conventional R-PDCCH, only a DL grant is allocated in a first slot of an existing RB and a UL grant or a data PDSCH may be allocated in a second slot of the existing RB. However, a shortcoming with the conventional R-PDCCH is that the DL grant should be decoded first. Herein, the R-PDCCH is allocated to REs except for a PDCCH region, CRSs, and Demodulation Reference Signals (DMRSs). As illustrated in [Table 1], all of the DMRSs and CRSs may be used to decode the R-PDCCH. If the DMRSs are used, port 7 and a Scrambling ID (SCID) of 0 are used. On the other hand, if the CRSs are used, port 0 is used only for one PBCH transmission antenna. For two PBCH transmission antennas and four PBCH transmission antennas, transmit diversity mode is set, and ports 0 and 1 and ports 0 to 3 are used, respectively.

TABLE 1

| Transmission mode | DCI format | Transmission scheme of PDSCH corresponding to R-PDCCH |
|---|---|---|
| Mode 8 | DCI format 1A | If the R-PDCCH is demodulated based on UE-specific reference signals: Single antenna port; port 7 and is used. If the R-PDCCH is demodulated based on cell-specific reference signals: If the number of PBCH antenna ports is one: Single-antenna port, port 0 is used Otherwise Transmit diversity is used |
| | DCI format 2B | Dual layer transmission, port 7 and 8; or single-antenna port, port 7 or 8 |
| Mode 9 | DCI format 1A | If the R-PDCCH is demodulated based on UE-specific reference signals: Single antenna port; port 7 and is used. If the R-PDCCH is demodulated based on cell-specific reference signals: If the number of PBCH antenna ports is one: Single-antenna port, port 0 is used Otherwise Transmit diversity is used |
| | DCI format 2C | Up to 4 layer transmission, ports 7-10 |

In the R-PDCCH structure, a DL grant and a UL grant are allocated to a first slot and a second slot, respectively and a control channel is allocated to the first slot. That is, the R-PDCCH being a downlink control channel has a pure Frequency Division Multiplexing (FDM) structure in that it is allocated only to the first slot. In contrast, allocation of an E-PDCCH in a full FDM structure, not limited to one slot, is under discussion.

In a legacy system, the starting position of a PDSCH in each cell may be different according to the PDCCH region size of the cell and a UE may determine the PDCCH region size by higher-layer signaling or by reading a Control Format Indicator (CFI) in a PCFICH. However, a UE of an RRH may receive a PDSCH in a part or all of resources of a PDCCH region in a cell including a macro eNB and RRHs. This resource management method is possible when no UE that should receive a PDCCH exists within RRH coverage.

Accordingly, the present invention proposes the following signaling required for PDSCH reception in a PDCCH region.

For application to the multi-node environment, there exists a pressing need for introducing a new control channel. Thus, a method for overcoming lack of a PDCCH capacity is proposed to enable transmission of control information about a node to each UE. In this context, the present invention is intended to overcome the problem of having difficulty in allocating a control channel region for each UE in a PDCCH region, in consideration of the distribution of legacy UEs conforming to the existing 3GPP LTE/LTE-A standard. In view of the lack of the PDCCH region, an E-PDCCH is allocated in the PDSCH region. Since an E-PDCCH region applied to each RRH moves to the PDSCH region, control information allocated to the PDCCH region is reduced. Accordingly, the following methods are proposed to allocate a PDSCH to a part of the PDCCH region according to a conventional CFI and thus utilize a wider PDSCH region.

In a first method, resource allocation information about a PDSCH region may be received by using a conventional CFI and receiving an additional CFI (CFI2). While the conventional CFI may be transmitted on a PCFICH, CFI2 for PDSCH transmission may be signaled additionally.

Figure 8:
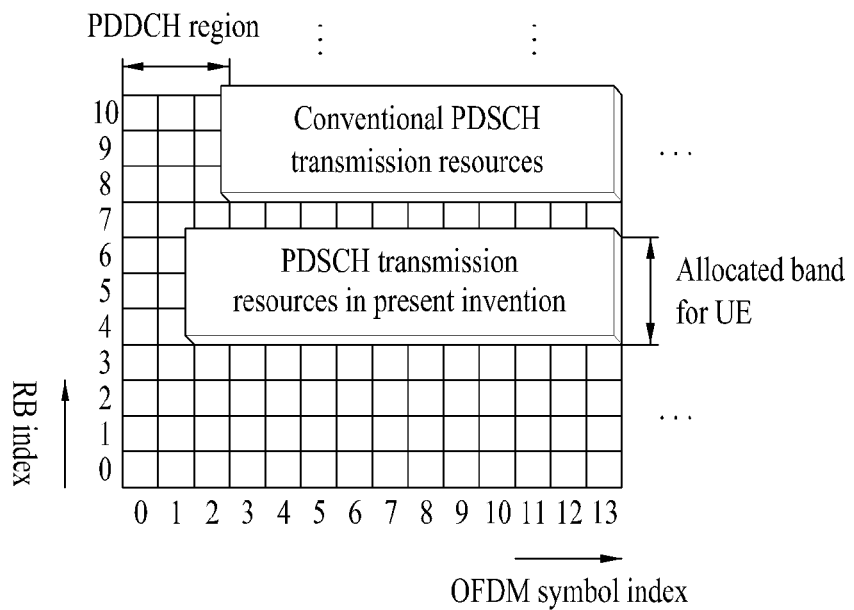
FIG. 8 illustrates an operation for transmitting a Physical Downlink Shared Channel (PDSCH) in a part of a PDCCH region according to a Control Format Indicator (CFI) and a second CFI (a CFI2) according to an embodiment of the present invention.

FIG. 8 illustrates an operation for transmitting a PDSCH in a part of a PDCCH region according to a CFI and CFI2 according to an embodiment of the present invention.

Referring to FIG. 8, a UE receives a CFI (CFI2) independent of a CFI of a PCFICH. A CFI indicating the number of OFDM symbols available for PDCCH transmission may still be used, or CFI2 indicating information about the start of OFDM symbols available for PDSCH transmission corresponding to an E-PDCCH may be configured separately.

A legacy UE receives the CFI indicating the number of OFDM symbols available for PDCCH transmission in the first symbol of a subframe. In other words, the CFI means information about the starting OFDM symbol of a PDSCH to the legacy UE.

For example, if CFI is '1', this means that 'a PDSCH starts in a second OFDM symbol' and if CFI is '2', this means that 'a PDSCH starts in a third OFDM symbol'. Accordingly, to receive a PDSCH, a legacy UE should know a CFI.

However, to receive a PDSCH in a PDCCH region as proposed in the present invention, a UE should receive CFI2 separately from a CFI. CFI2 is a parameter that determines the starting OFDM symbol of the PDSCH. CFI2 represents the starting OFDM symbol of the PDSCH directly or the span of DCI in the PDCCH region, reduced by the PDSCH. That is, CFI2 means the number of reduced OFDM symbols relative to the span of DCI represented by the CFI. Thus, the CFI may not indicate the starting OFDM symbol of a PDSCH depending whether the CFI is identical to CFI2.

CFI2 may be configured independently of the CFI, rather than CFI2 is configured to indicate the number of OFDM symbols decreased from the span of DCI represented by the CFI. Therefore, a starting OFDM symbol indicated by CFI2 may be the first OFDM symbol in an extreme case or an OFDM symbol earlier than an OFDM symbol indicated by the CFI. That is, the starting OFDM symbol available for PDSCH transmission corresponding to an E-PDCCH may be positioned before an OFDM symbol indicated by the CFI. For example, the CFI may indicate the third OFDM symbol and CFI2 may indicate the first OFDM symbol. Therefore, CFI2 may indicate a starting OFDM symbol freely according to a system determination, independently of the conventional CFI. Thus the starting OFDM symbol may be even the first OFDM symbol.

Therefore, the UE may receive one or both of the CFI and CFI2. If the UE reads a control channel in the PDCCH region and an E-PDCCH, the UE should receive both a CFI indicating the number of OFDM symbols available for PDCCH transmission and CFI2 indicating the number of OFDM symbols available for PDSCH transmission corresponding to the E-PDCCH. Or even though the UE reads only the E-PDCCH, if the starting OFDM symbol of the E-PDCCH changes according to the size of the PDCCH region, the UE should receive the CFI and CFI2 because CFI2 represents the decreased number of symbols with respect to the CFI. On the other hand, if the UE reads only an E-PDCCH having a fixed starting OFDM symbol without reading information in the PDCCH region, the UE may receive only CFI2. Herein, CFI2 represents a smaller OFDM symbol index than the CFI. That is, the lack of the PDCCH region may be overcome by allocating a PDSCH to the PDCCH region using CFI2. If a PDSCH is allocated to the PDCCH region, all antennas of an eNB transmit control channels for all UEs within the cell of the eNB in the PDCCH region according to the current CAS-based communication standards, as illustrated in FIG. 1. According to the present invention, a PDSCH may be allocated to the PDCCH region being a control channel region. In this case, control information for a UE other than an RRH UE allocated to the PDCCH region, for example, an idle UE, or general control information may be lost due to interference from PDSCH transmission corresponding to an E-PDCCH. However, the eNB may transmit DMRSs of control information and each UE may reduce the impact of beamforming from the eNB by controlling a beam gain according to precoding. That is, the impact of beamforming caused by other antennas may be reduced by controlling a beam gain using a convolutional code. In addition, even though a PDSCH is allocated to a part of the PDCCH region, the PDSCH allocation to the PDCCH region does not matter much because only one or two symbols of 12 symbols in the PDCCH region are affected.

Accordingly, the present invention provides a method for determining a PDSCH region according to a CFI and CFI2 and receiving a PDSCH from an eNB based on first CFI information and second CFI information.

In the present invention, CFI2 may be transmitted to a UE largely in two methods: a CFI2 transmission method by RRC signaling and a method for inserting a CFI2 field in the contents of an E-PDCCH. The method for transmitting CFI2 to a UE by higher-layer signaling does not require adding or changing of a parameter. On the other hand, the method for inserting a CFI2 field in the contents of an E-PDCCH may immediately reflect a dynamic change of a PDCCH region or a PDSCH region for a UE. Or CFI2 may have the same value as a CFI transmitted on a legacy PCFICH. If the CFI has a fixed value, for example, the starting symbol of a PDSCH corresponding to an E-PDCCH is fixed, the CFI2 field may be inserted in the contents of the E-PDCCH.

In a second method, an environment in which a PDSCH is transmitted in a PDCCH region is specified according to a CFI and CFI2. That is, a range to which the first method is applicable is specified.

Among 10 subframes of one frame, subframe 0 to subframe 9, there are some subframes characterized by transmission of a control channel in a PDCCH region for a UE whose position is not detected. For example, subframes 0, 4, 5, and 9 are used to transmit a paging channel. Information about the paging channel is transmitted on a data channel and common information is transmitted in a common search space. In the present invention, a control signal for each UE is scrambled with one Cell-Radio Network temporary Identity (C-RNTI) and transmitted in a PDCCH region on the assumption that each UE has the same cell ID. In this case, the first method is not implemented to protect the control signal for the UE using the paging channel. That is, the eNB uses only the conventional CFI not to change the PDCCH region, without allocating a PDSCH region for data transmission according to CFI2. Or the UE acquires allocated RE information using only the CFI, ignoring CFI2. The UE receiving the paging channel is not located because it is in idle mode. Thus, PDSCHs for other UEs may not be transmitted in the PDCCH region. In a certain subframe in which a control channel for a UE which is not located is transmitted in a PDCCH region, a starting OFDM symbol of a PDSCH indicated by CFI2 should be identical to a starting OFDM symbol of a PDSCH indicated by the CFI. Otherwise, the UE ignores CFI2. In other words, a PDSCH is received from the eNB by applying only the CFI to a subframe in which a control channel for an idle UE, that is, a UE receiving a paging channel is transmitted. If the second method is used, a subframe in which the eNB and the UE should perform this operation is fixed or indicated to the UE by higher layer signaling, as in the above example.

Figure 9:
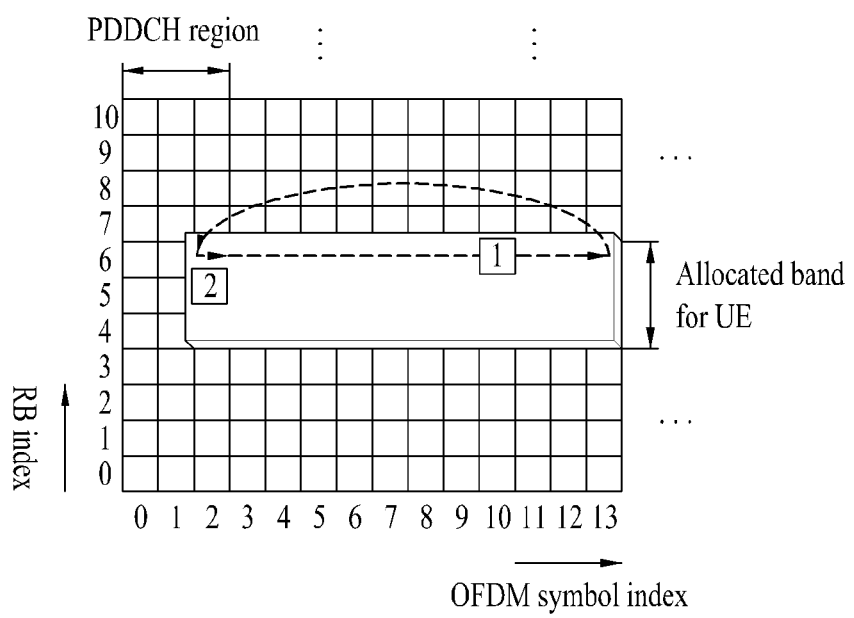
FIGS. 9 and 10 illustrate mapping of a PDSCH to Resource Elements (REs) according to an embodiment of the present invention.
Figure 10:
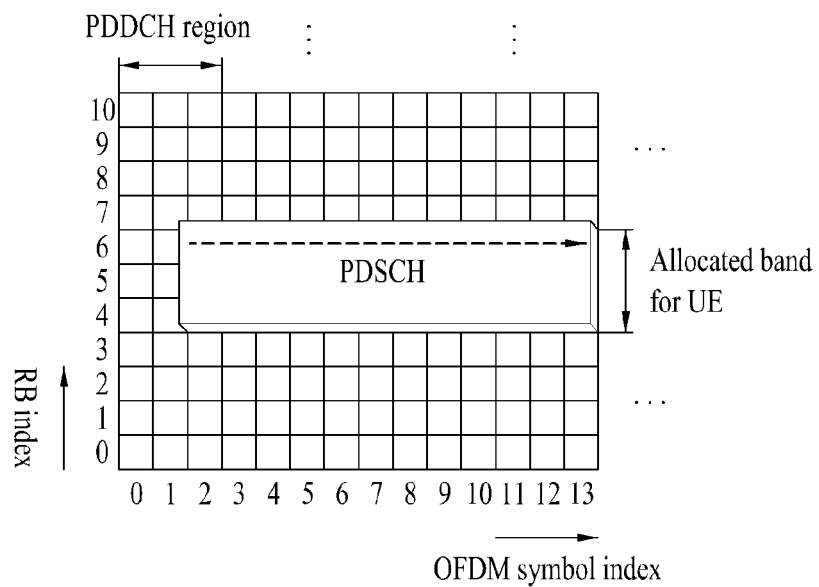

FIGS. 9 and 10 illustrate mapping of a PDSCH to REs according to an embodiment of the present invention.

Referring to FIG. 9, when a PDSCH is mapped to REs, the PDSCH is mapped to allocated resources in a PDSCH region in a conventional manner and then to allocated resources in a PDCCH region. The RE mapping is performed in the first OFDM symbol of an allocated resource area along the frequency axis and then the same RE mapping is repeated in the next OFDM symbol. For example, a PDSCH is mapped to REs in OFDM symbols 3 to 13 and then to REs in OFDM symbol 2, as illustrated in FIG. 9. That is, the PDSCH is mapped to REs first in the PDSCH region indicated by the conventional CFI. If the CFI is different from CFI2, the PDSCH is additionally mapped to REs, starting from the start of a PDSCH region indicated by CFI2 in a circular manner. Accordingly, if mapping is performed in the manner illustrated in FIG. 9, an existing buffer may still be used.

Referring to FIG. 10, when a PDSCH is mapped to REs, the RE mapping starts from a starting symbol of a PDCCH region and then is performed in a conventional PDSCH region. The RE mapping is performed in the first OFDM symbol of an allocated resource area along the frequency axis and the same RE mapping is repeated in the next OFDM symbol.

Therefore, the RE mapping of a PDSCH according to the present invention involves mapping according to the conventional CFI (1) and then mapping starting from a starting OFDM symbol indicated by CFI2 (2). Or as illustrated in FIG. 10, the RE mapping may be performed starting from the starting OFDM symbol indicated by CFI2. The mapping rules of FIGS. 9 and 10 are the same in terms of performance such as interference and selected by the eNB.

The UE is already aware of the starting position of a PDSCH region according to the CFI or CFI2 and receives information about REs mapped according to the mapping rules of FIGS. 9 and 10.

Figure 11:
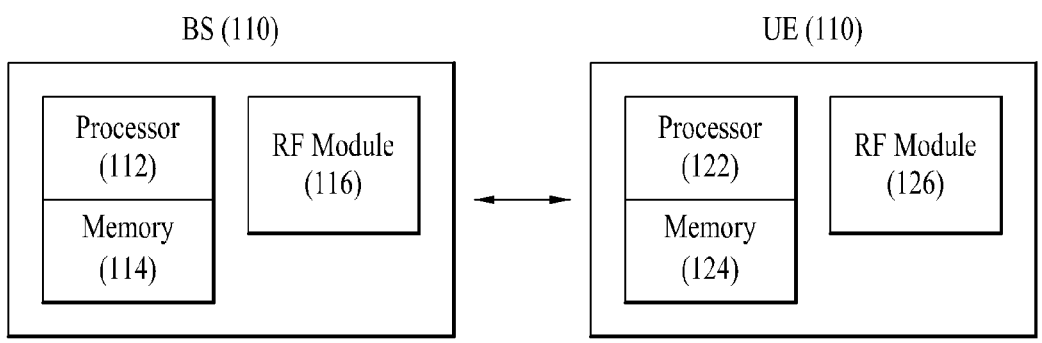
FIG. 11 illustrates a Base Station (BS) and a User Equipment (UE) that are applicable to the present invention.

FIG. 11 is a block diagram of a BS and a UE which may be applied to an embodiment of the present invention.

The UE may operate as a transmitter on a UL and as a receiver on a DL. In contrast, the BS may operate as a receiver on the UL and as a transmitter on the DL.

Referring to FIG. 11, a wireless communication system includes a BS 110 and a UE 120. The BS 110 includes a processor 112, a memory 114, and a Radio Frequency (RF) unit 116. The processor 112 may be configured to perform procedures and/or methods proposed by the present invention. The processor 112 may control the RF unit 116 to transmit first CFI information indicating the number of OFDM symbols available for PDCCH transmission. Or the processor 112 may be configured to control the RF unit 116 to transmit second CFI information indicating a starting of OFDM symbol available for PDSCH transmission corresponding to an E-PDCCH. Or the processor 112 may control the RF unit 116 to transmit a PDSCH to the UE 120 using the first CFI information and the second CFI information. Herein, the PDCCH may reside in a PDCCH region of a DL subframe and the E-PDCCH may reside in a PDSCH region of the DL subframe. Or the processor 112 may be configured to control the RF unit 116 to transmit the first CFI information to the UE 120 by RRC signaling and to transmit the second CFI information to the UE by RRC signaling or the E-PDCCH. Or the processor 112 may control the RF unit 116 to transmit a PDSCH to the UE only based on the first CFI information in a subframe carrying a control channel to an idle UE. Herein, the second CFI information indicates the number of OFDM symbols decreased relative to the first CFI information. The memory 114 is connected to the processor 112 and stores various types of information related to the operations of the processor 112. The RF unit 116 is connected to the processor 112 and transmits and/or receives a radio signal. The UE 120 includes a processor 122, a memory 124, and an RF unit 126. The processor 122 may be configured to perform procedures and/or methods proposed by the present invention. The processor 122 may control the RF unit 126 to receive, from the eNB 110, first CFI information indicating the number of OFDM symbols available for PDCCH transmission. Or the processor 122 may be configured to control the RF unit 126 to receive, from the eNB 110, second CFI information indicating a starting OFDM symbol available for PDSCH transmission corresponding to an E-PDCCH. Or the processor 122 may control the RF unit 126 to receive a PDSCH from the eNB 110 using the first CFI information and the second CFI information. Or the processor 122 may be configured to control the RF unit 116 to receive the first CFI information from the eNB 220 by RRC signaling and to receive the second CFI information from the eNB 220 by RRC signaling or the E-PDCCH. Or the processor 122 may control the RF unit 126 to receive a PDSCH from the eNB 220 only based on the first CFI information in a subframe carrying a control channel to an idle UE. The memory 124 is connected to the processor 122 and stores various types of information related to the operations of the processor 122. The RF unit 126 is connected to the processor 122 and transmits and/or receives a radio signal. The BS 110 and/or the UE 120 may have a single antenna or multiple antennas.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention may be used for a UE, an eNB, or other equipment in a wireless communication system. Specifically, the present invention may be used in a multi-node system that provides a communication service to a UE through a plurality of nodes.

The invention claimed is:

1. A method for receiving a downlink data channel from a base station at a user equipment in a wireless communication system, the method comprising:
   receiving the downlink data channel in a subframe comprising a plurality of symbols from the base station,
   wherein, if the downlink data channel is scheduled by a first downlink control channel, a starting symbol of the downlink data channel in the subframe is configured by a value carried via a physical control format indicator channel,
   wherein, if the downlink data channel is scheduled by a second downlink control channel, the starting symbol of the downlink data channel in the subframe is configured by a higher layer parameter.

2. The method of claim 1, wherein, if the downlink data channel is scheduled by the second downlink control channel, a starting symbol of the second downlink control channel is same with the starting symbol of the downlink data channel.

3. The method of claim 1, wherein the value carried via the control format indicator channel indicates a number of symbols for the first downlink control channel.

4. The method of claim 1, wherein an index of the starting symbol of the downlink data channel scheduled by the second downlink control channel is less than or equal to an index of the starting symbol of the downlink data channel scheduled by the first downlink control channel.

5. A method for transmitting a downlink data channel to a user equipment at a base station in a wireless communication system, the method comprising:
   transmitting the downlink data channel in a subframe comprising a plurality of symbols to the user equipment, wherein, if the downlink data channel is scheduled by a first downlink control channel, a starting symbol of the downlink data channel in the subframe is configured by a value carried via a physical control format indicator channel, wherein, if the downlink data channel is scheduled by a second downlink control channel, the starting symbol of the downlink data channel in the subframe is configured by a higher layer parameter.

6. The method of claim 5, wherein, if the downlink data channel is scheduled by the second downlink control channel, a starting symbol of the second downlink control channel is same with the starting symbol of the downlink data channel.

7. The method of claim 5, wherein the value carried via the control format indicator channel indicates a number of symbols for the first downlink control channel.

8. The method of claim 5, wherein an index of the starting symbol of the downlink data channel scheduled by the second downlink control channel is less than or equal to an index of the starting symbol of the downlink data channel scheduled by the first downlink control channel.

9. A user equipment in a wireless communication system, the user equipment comprising:
 a Radio Frequency (RF) module; and
 a processor for controlling the RF module to receive a downlink data channel in a subframe comprising a plurality of symbols from a base station,
 wherein, if the downlink data channel is scheduled by a first downlink control channel, a starting symbol of the downlink data channel in the subframe is configured by a value carried via a physical control format indicator channel,
 wherein, if the downlink data channel is scheduled by a second downlink control channel, the starting symbol of the downlink data channel in the subframe is configured by a higher layer parameter.

10. The user equipment of claim 9, wherein, if the downlink data channel is scheduled by the second downlink control channel, a starting symbol of the second downlink control channel is same with the starting symbol of the downlink data channel.

11. The user equipment of claim 9, wherein the value carried via the control format indicator channel indicates a number of symbols for the first downlink control channel.

12. The user equipment of claim 9, wherein an index of the starting symbol of the downlink data channel scheduled by the second downlink control channel is less than or equal to an index of the starting symbol of the downlink data channel scheduled by the first downlink control channel.

13. A base station in a wireless communication system, the base station comprising:
 a Radio Frequency (RF) module; and
 a processor for controlling the RF module to transmit a downlink data channel in a subframe comprising a plurality of symbols to a user equipment,
 wherein, if the downlink data channel is scheduled by a first downlink control channel, a starting symbol of the downlink data channel in the subframe is configured by a value carried via a physical control format indicator channel,
 wherein, if the downlink data channel is scheduled by a second downlink control channel, the starting symbol of the downlink data channel in the subframe is configured by a higher layer parameter.

14. The base station of claim 13, wherein, if the downlink data channel is scheduled by the second downlink control channel, a starting symbol of the second downlink control channel is same with the starting symbol of the downlink data channel.

15. The base station of claim 13, wherein the value carried via the control format indicator channel indicates a number of symbols for the first downlink control channel.

16. The base station of claim 13, wherein an index of the starting symbol of the downlink data channel scheduled by the second downlink control channel is less than or equal to an index of the starting symbol of the downlink data channel scheduled by the first downlink control channel.

* * * * *